Feb. 26, 1924.　　　　　　　　　　　　　　　　　　　　1,484,748
H. M. YEAGER
RADIATOR MOUNTING
Filed Sept. 20, 1921　　　2 Sheets-Sheet 2
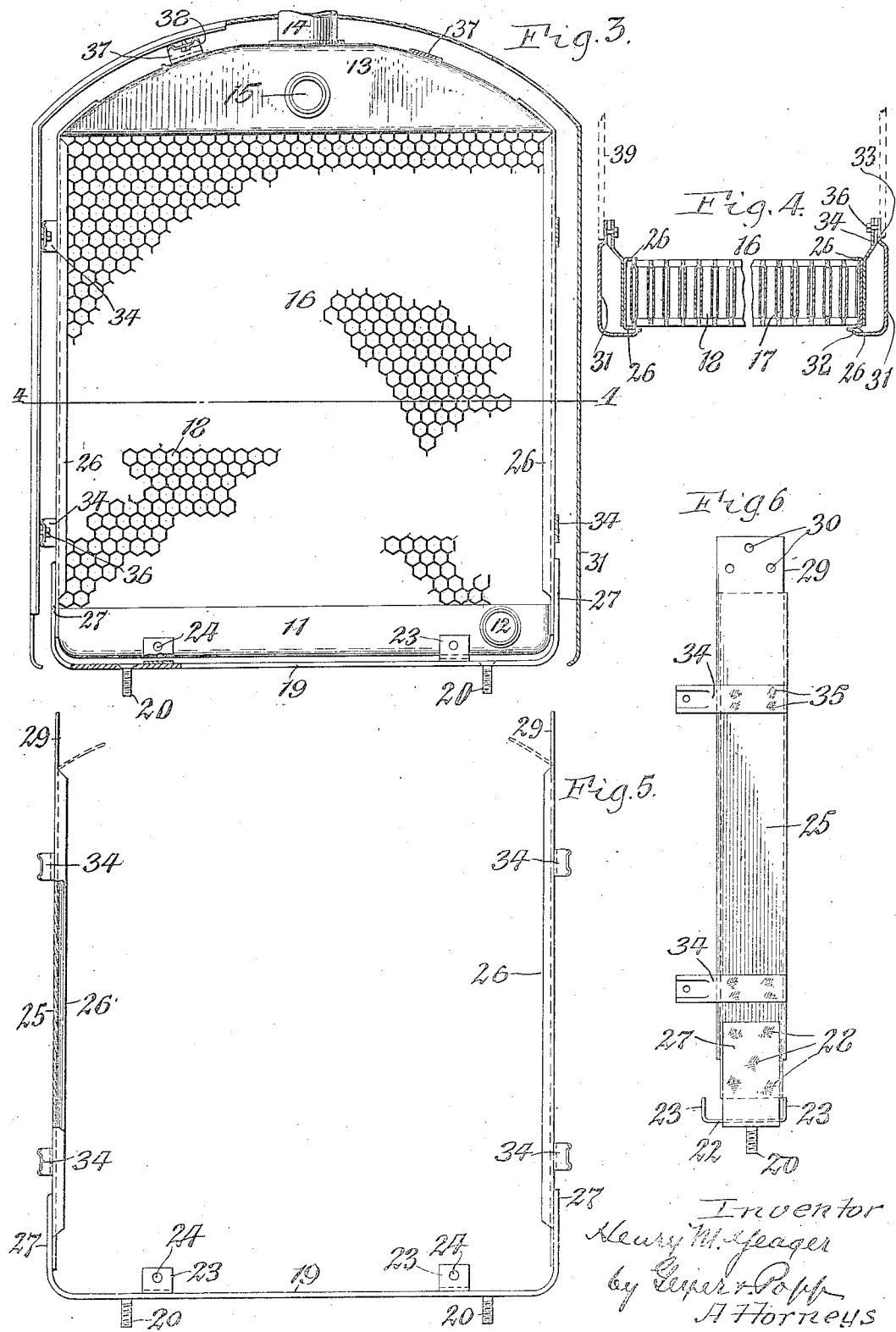

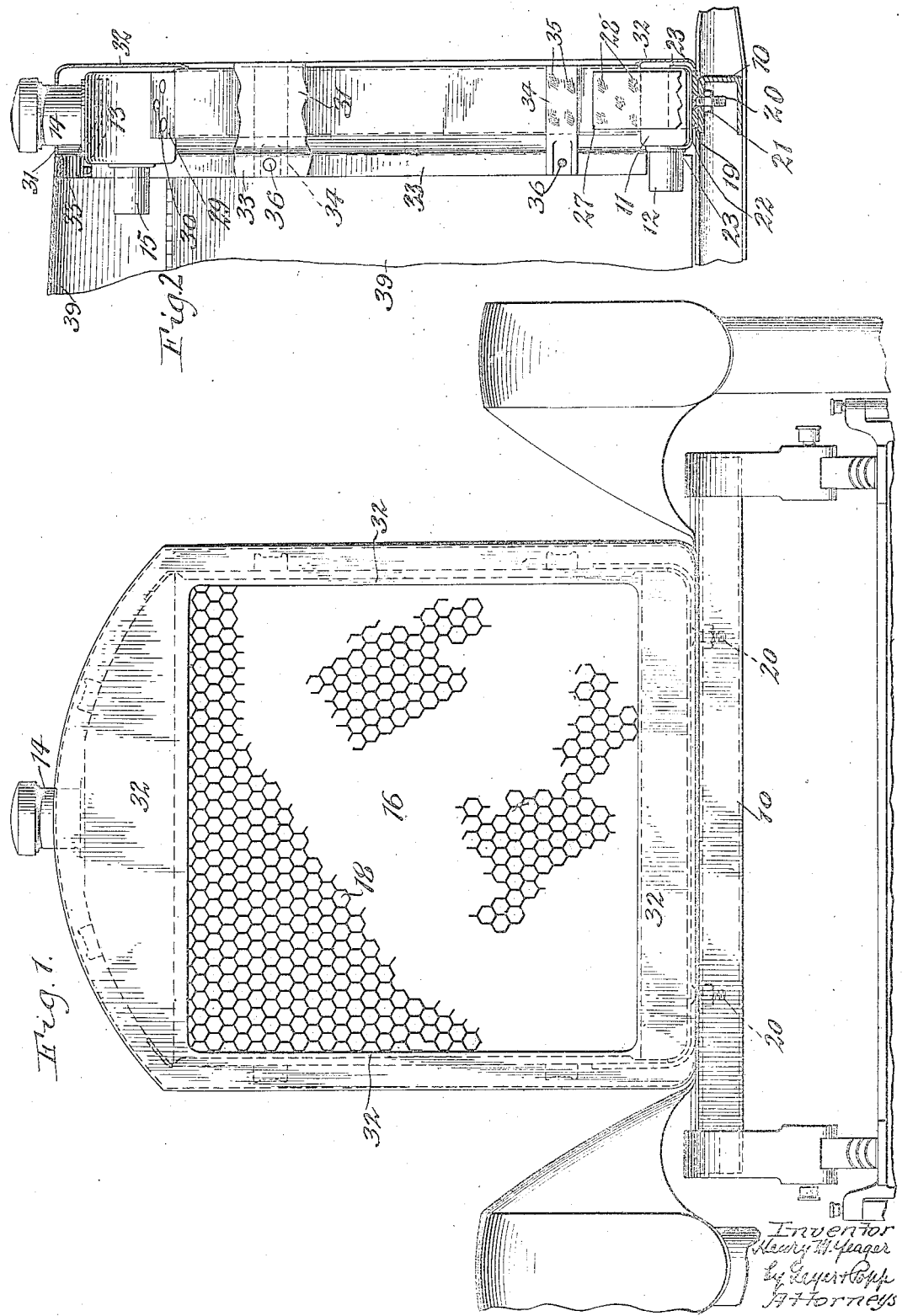

Patented Feb. 26, 1924.

1,484,748

UNITED STATES PATENT OFFICE.

HENRY M. YEAGER, OF BUFFALO, NEW YORK, ASSIGNOR TO FEDDERS MANUFACTURING COMPANY, INC., OF BUFFALO, NEW YORK, A CORPORATION OF NEW YORK.

RADIATOR MOUNTING.

Application filed September 20, 1921. Serial No. 501,996.

*To all whom it may concern:*

Be it known that I, HENRY M. YEAGER, a citizen of the United States, residing in Buffalo, in the county of Erie and State of New York, have invented new and useful Improvements in Radiator Mountings, of which the following is a specification.

This invention relates to an improved mounting whereby a radiator of an automobile is supported upon the main frame or chassis.

In the method heretofore employed for holding a radiator in place on the automobile, the lower water box or tank rested upon the front cross bar of the main frame and is connected therewith by bolts passing directly through this cross bar and engaging with screw nuts fastened on the inner side of this water box. This construction is objectionable because the radiator when subjected to vibration during the running of the car would weave, twist or become racked so that in time the lower corners of the lower water box would crack and leak.

It is the purpose of this invention to provide means for fastening the radiator in place, which are so designed that the radiator is not supported solely at its lower end, but instead is supported at its side edges and top as well, so that the radiator is free to float and shift its position bodily within certain limits under the strains to which the same may be subjected while the car is in use without producing any weaving or distorting effect on the radiator and thus avoid cracking and leakage as has occurred heretofore.

In the accompanying drawings:

Figure 1 is a front elevation of an automobile showing a radiator mounted thereon in accordance with my invention. Figure 2 is a fragmentary longitudinal section of the same. Figure 3 is a front elevation, partly in section, of the radiator and its enclosing casing associated with my improved means for supporting the same on an automobile frame. Figure 4 is a fragmentary horizontal section taken on line 4—4, Fig. 3. Figure 5 is a detached front elevation of the saddle and the associated parts of my improved radiator mounting. Figure 6 is a side elevation of the same.

Similar characters of reference refer to like parts throughout the several views.

10 represents the horizontal cross bar of the main frame or chassis of the automobile which in this instance forms the supporting member of this frame upon which the radiator and parts associated therewith are mounted.

My improved mounting is not necessarily associated with any particular type of radiator, but may be used to advantage with radiators of various constructions, that shown in the drawings being an example of one suitable for use in connection with this invention, and as there shown this radiator comprises a lower water box or tank 11 preferably of sheet metal, provided on its rear side with a water outlet 12 which connects with a lower part of the water jacket of the engine which is to be cooled, an upper water box or tank 13, preferably of sheet metal, provided in its top with a filler 14 through which water is introduced into this tank, and provided on its rear side with an outlet 15 whereby the same is connected with the upper part of the water jacket or cooling system of the engine, and an intermediate core 16, preferably of sheet metal, which is constructed to form a plurality of upright water passages 17 extending from the upper water tank 13 to the lower water tank 11, and a plurality of horizontal air passages 18 extending from the front side of the core to the rear side of the same so that the heated water passing through the conduit 17 from one tank to another is cooled by the air passing through the tubes 18.

The mounting shown in the drawings and containing the preferred embodiment of my invention is constructed as follows:

19 represents a lower horizontal cross bar of flat metal which is arranged transversely on top of the frame member 10, and rigidly connected therewith by means of bolts 20 passing downwardly through this cross bar and the frame member 10 and each provided at its lower end with a nut 21 bearing against the underside of this frame member, as best shown in Figs. 1 and 2. On its upper side this cross bar 19 is provided with one or more clips of metal, preferably two in number, each of which is of substantially U-shaped form and secured with its web 22 to the upper side of the cross bar 19 by spot welding or otherwise, so that this web is arranged horizontally and lengthwise of the radiator and the lugs 23 thereof project upwardly so that the concave side of this clip opens upwardly. These clips therefore form two upwardly opening seats which receive the lower edge of the lower water box adjacent to the opposite vertical edges thereof, so that the underside of this box rests upon the webs 22 of the clips and the lugs 23 of the latter engage with the front and rear sides of this water box. Any suitable means may be employed for connecting the upper ends of these lugs of the lower clips with the front and rear sides of the lower water box holding the latter in place, this being preferably accomplished by providing each of these lugs with an opening 24 so as to facilitate the connection of these lugs with the lower water box by brazing, soldering or cementing. By this means no direct connection to the underside of the radiator and the main frame of the automobile is effected.

Adjacent to opposite vertical edges of the radiator are arranged two upright arms, each of which consists of an upright longitudinal web 25 and upright flanges 26 projecting inwardly from opposite vertical edges of the web 25, so that this bar is of U-shaped form in cross section and has its channel or concave side facing inwardly. Each of these upright arms is connected with one end of the horizontal bar 19, this being preferably effected by providing the opposite ends of the bar 19 with outwardly projecting brackets 27, each of which is secured to the outer side of the lower end of the web 25 of one of the supporting arms by means of spot welding, as shown at 28 in Fig. 6 or by any other suitable means. The opposite vertical edges of the radiator are arranged in the seats formed by the concave or channel shaped inner sides of the upright arms, the inner side of each web 25 engaging with the longitudinal side of the respective edge of the radiator, while the flanges 26 engage with the front and rear transverse sides of the same, as shown in Figs. 3 and 4, thereby holding the radiator against lateral as well as longitudinal displacement between these supporting arms. There is no rigid connection between these upright supporting arms and the radiator so that these arms and the cross bar 19 upon which the lower end of the radiator rests, together form a cradle or hammock in which the radiator is free to move horizontally both laterally and lengthwise of the car within certain limits, so that the radiator practically floats and is thus prevented from weaving and becoming distorted under the vibration to which the same is subjected when the car is in use and thus avoid cracking of its lower water tank or other conduit connected therewith and permit leakage of the water therefrom, as has been the case in radiators which have been rigidly supported by the means heretofore in common use.

It is preferable to connect the upright supporting arms with the upper water box or tank in order to hold these parts in their proper position relatively to each other and for this purpose the upper ends of the webs 25 of the upright arms are provided with integral lips 29 which are bent over the upper sides of the upper water tank adjacent to opposite ends thereof and connected thereto by brazing, which operation is facilitated by providing these lips with openings 30 as shown in Fig. 6, although these lips may be otherwise secured to the upper water tank.

The casing which encloses the radiator and its support for giving the same a neat and finished appearance may be of any suitable construction, but as shown in the drawings the same comprises a peripheral wall 31 extending over the top of the core and along the vertical edges of the same, a front flange 32 projecting inwardly from this wall and engaging with the front side of the marginal part of the core so as to form a border therefor, and a rear flange 33 projecting inwardly from the rear edge of the wall 31 which rear flange usually forms a shoulder against which the hood rests, which encloses the gas engine, commonly arranged immediately in rear of the radiator. This casing may be held in place by any suitable means, but in the present case, the same is preferably detachably connected with the upright supporting arms of the saddle or cradle and also with the upper water tank. For this purpose, each of the upright supporting arms is provided with two horizontal supporting clips 34 which are connected at their front ends with the outer side of the web 25 of one of the supporting arms near the top and bottom thereof, by means of spot welding 35, or otherwise, while their rear ends are deflected outwardly and connected with the upright parts of the flanges 33 on the rear part of the casing by means of bolts 36, as best shown in Figs. 2, 3 and 4. Similar clips 37 are secured at their front ends to the top of the upper water tank on opposite sides of the filler 14 while their rear ends are connected with the rear flange of the casing by means of bolts 38, as best shown in Figs. 1, 2 and 3.

This improved mounting therefore not only serves to support the radiator but also supports the casing so that these several parts are also held in a definite relation to each other and are prevented from becoming displaced in such manner as will cause weaving, racking or distortion of the radiator, thus avoiding the liabilty of cracking the radiator and permitting the water to leak therefrom, as has been frequently the case when mounting the radiator on the main frame by means heretofore in common use.

I claim as my invention:

1. A radiator mounting comprising a saddle having a lower horizontal bar which is adapted to rest on the frame of an automobile and to support a radiator at its lower end, and two arms projecting upwardly from opposite ends of the horizontal bar and adapted to be connected with the radiator at the upright edge portions of the same and an independent casing surrounding said saddle and radiator and connected therewith.

2. A radiator mounting comprising a saddle having a lower horizontal bar adapted to be arranged between the top of a frame member and the bottom of a radiator, studs projecting downwardly from said horizontal bar and adapted to pass through openings in said frame member and provided with screw nuts at their lower ends which are adapted to engage with the underside of said frame member, and upright arms arranged at opposite ends of said horizontal bar and adapted to be arranged along opposite vertical edges of the radiator and to be secured thereto and an independent casing surrounding said saddle and radiator and connected therewith.

3. A radiator mounting comprising a saddle having a horizontal bar adapted to be secured to the top of a frame member, U-shaped clips arranged on said bar and each adapted to receive in its concave side the lower end of the radiator, and upright arms arranged at opposite ends of said horizontal bar and adapted to be connected with opposite vertical edges of said radiator and an independent casing surrounding said saddle and radiator and connected therewith.

4. A radiator mounting comprising a saddle having a horizontal bar adapted to be secured to the top of a frame member, U-shaped clips arranged on said bar and each adapted to receive in its concave side the lower end of the radiator, and upright arms projecting upwardly from opposite ends of said horizontal bar and each arm being of U-form in cross section and adapted to receive in its channel one of the vertical edges of the radiator and an independent casing surrounding said saddle and radiator and connected therewith.

5. A radiator mounting comprising a saddle having a lower horizontal bar which is adapted to rest on the frame of an automobile and to support a radiator at its lower end, and two arms projecting upwardly from opposite ends of the horizontal bar and adapted to be connected with the radiator at the upright edge portions of the same, and each arm being provided at its upper end with a lip which is adapted to be secured to the top of the radiator and an independent casing surrounding said saddle and radiator and connected therewith.

6. A radiator mounting comprising a saddle having a lower horizontal bar which is adapted to rest on the frame of an automobile and to support a radiator at its lower end, two arms projecting upwardly from opposite ends of the horizontal bar and adapted to be connected with the radiator at the upright edge portions of the same, and each arm being provided at its upper end with an inwardly turned lip which is adapted to be secured to the adjacent portion of the top of the radiator and an independent casing surrounding said saddle and radiator and connected therewith.

7. A radiator mounting comprising a saddle having a support for a radiator at the lower end thereof and supports for the same above the lower end thereof and adjacent to its vertical edges and an independent casing surrounding said saddle and radiator and connected therewith.

8. A radiator mounting comprising a saddle having a lower horizontal bar which is adapted to rest on the frame of an automobile and to support a radiator at its lower end, and two arms projecting upwardly from opposite ends of the horizontal bar and adapted to be connected with the radiator at the upright edge portions of the same, said arms being provided with rearwardly projecting clips which are adapted to be connected with a casing enclosing the radiator and an independent casing surrounding said saddle and radiator and connected therewith.

9. A radiator mounting comprising a saddle having a lower horizontal bar which is adapted to rest on the frame of an automobile and to support a radiator at its lower end, two arms projecting upwardly from opposite ends of the horizontal bar and adapted to be connected with the radiator at the upright edge portions of the same, a casing having a peripheral wall adapted to surround the radiator and provided at its front edge with an inwardly projecting flange which is adapted to engage the front side of the radiator, and top clips adapted to be arranged on the top of the radiator and secured to the upper parts of said casing.

10. A radiator mounting comprising a saddle having a lower horizontal bar which is adapted to rest on the frame of an automobile and to support a radiator at its lower end, two arms projecting upwardly from opposite ends of the horizontal bar and adapted to be connected with the radiator at the upright edge portions of the same, a casing having a peripheral wall adapted to surround the radiator and provided at its front edge with an inwardly projecting flange which is adapted to engage the front side of the radiator, top clips adapted to be arranged on the top of the radiator and secured to the upper parts of said casing, side clips arranged on said arms, and bolts connecting said side clips with the side parts of said casing.

HENRY M. YEAGER.